United States Patent
Neal

[11] 3,840,875
[45] Oct. 8, 1974

[54] RADIANT ENERGY MATRIX AND SYSTEM

[76] Inventor: John C. Neal, 214 St. Christopher Ln., Columbus, Ohio 43213

[22] Filed: Aug. 23, 1973

[21] Appl. No.: 390,904

[52] U.S. Cl.............. 343/5 R, 325/370, 343/854, 343/876
[51] Int. Cl........................ G01s 9/02, H01q 21/06
[58] Field of Search.................. 343/5 R, 854, 876; 325/370

[56] References Cited
UNITED STATES PATENTS
2,938,999  5/1960  Etter................... 343/876 X
3,541,565  11/1970  Zisler................... 343/854
3,680,110  7/1972  Goldstone................ 343/854 X Primary Examiner—T. H. Tubbesing

[57] ABSTRACT

A physically spaced array of antenna transducers, such as inductors, are interconnected as a direct access matrix and sequentially switched into connection with a signal processing means. The switching is accomplished by a plurality of gates controlled by a clock operated delay line type shift register synchronized by suitable frequency dividers. Preferably, each antenna transducer is alternately connected first to a transmitter for radiating radiant energy and then to a receiver for sensing reflected radiant energy.

12 Claims, 1 Drawing Figure

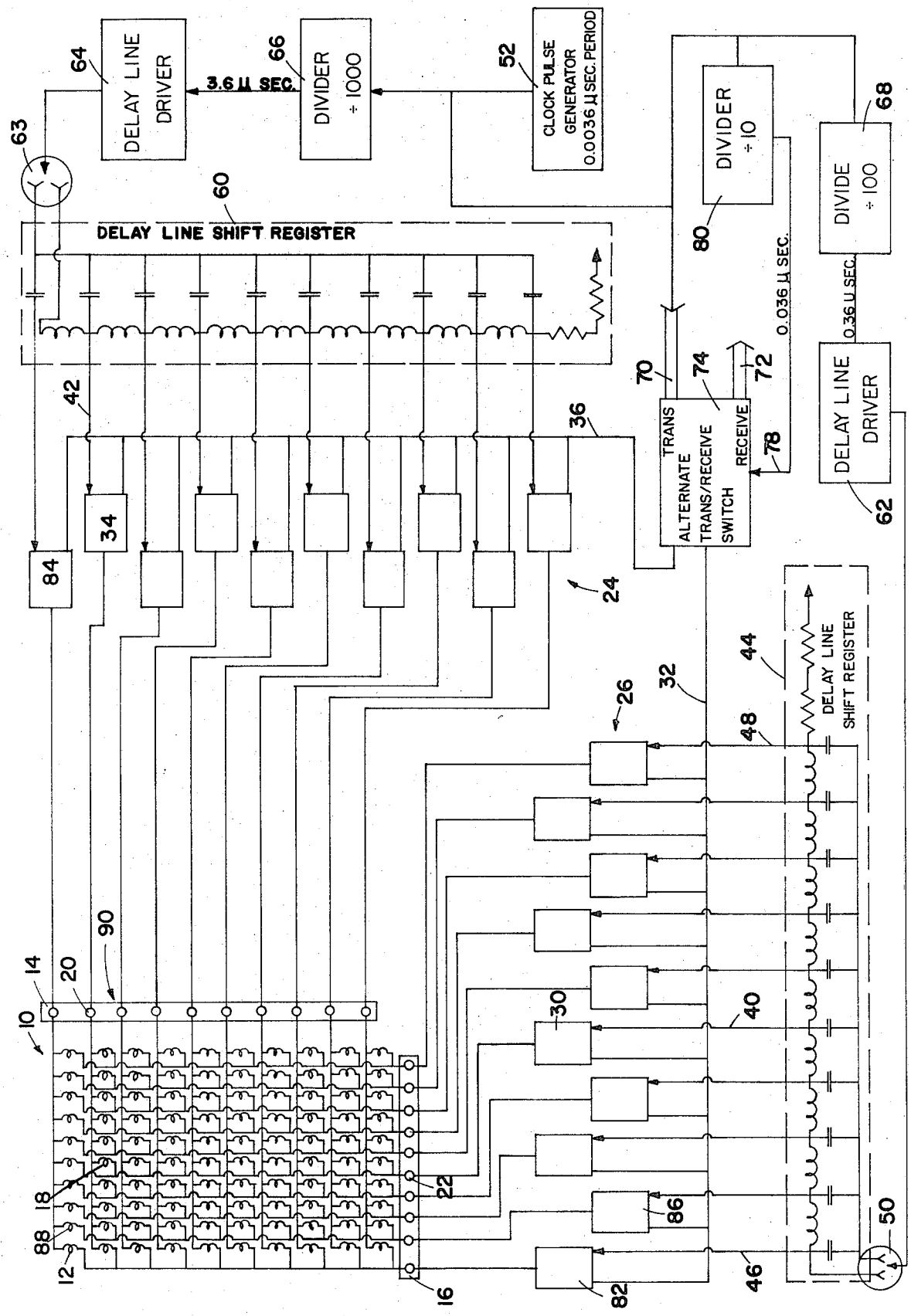

RADIANT ENERGY MATRIX AND SYSTEM

BACKGROUND

This invention relates generally to radiant energy radiators, absorbers and signal processing means and more particularly relates to a switched, direct access matrix array of antenna transducers.

Radiant energy is used in a variety of systems including detection systems, such as mineral detectors, radar and sonar systems, and in communication systems. Ordinarily such systems have in common first, an energy radiating device which is connected to a signal processing means, such as a transmitter, and second an energy absorbing means connected to a signal processing means such as a receiver, demodulator or metering system.

The energy radiators and absorbers are herein referred to as antennae or antenna transducers which terms are used interchangeably, because they ordinarily transform one form of energy into another form of energy. For example, electromagnetic radiation, light or sound may be transformed into electronic signals or electronic signals may be transformed into electromagnetic radiation, light or sound.

For use with such systems, many types of arrays have been proposed. This invention deals with a novel array of antenna transducers together with a switching means for operating them in a novel manner.

SUMMARY OF THE INVENTION

The invention is a radiant energy apparatus for connection to a signal processing means and comprises a physically spaced array of antennae interconnected as a direct access matrix and a switching means for sequentially connecting each of the antennae to said signal processing means.

It is an object of the invention to provide an improved energy radiating and detecting apparatus.

Another object of the invention is to provide an improved antenna transducer array and operating method suitable for use with mineral detectors, radar, sonar, communication systems and the like.

Further objects and features of the invention will be apparent from the following specification and claims when considered in connection with the accompanying drawings illustrating the preferred embodiment of the invention.

DESCRIPTION OF THE DRAWING

The FIGURE is a schematic and block diagram illustrating the preferred embodiment of the invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the term connection is not necessarily limited to direct connection but may include connection through other circuit elements where such connection is recognized as equivalent by those skilled in the art.

DETAILED DESCRIPTION

The FIGURE illustrates an array indicated generally as 10, of physically spaced antenna transducers which are interconnected as a direct access matrix. The illustrated preferred antenna transducers are inductors, such an inductor 12, electrically connected as a two dimensional matrix having two series of connecting terminals 14 and 16. Although the preferred antenna transducers are inductors, it should be understood that they equivalently could be capacitors, conventional communication type antennae, or other electromagnetic transducers. Alternatively, the matrix array could include audio or light transducers or transducers for any other type of radiant energy.

The preferred array 10 is a ten unit by ten unit, rectangularly arranged, two dimensional matrix with the antenna transducers themselves physically mounted to a suitable support. However, the antenna transducers forming the array could be spaced in an irregular or other regular geometrical pattern such as, for example, a cross pattern or a circular pattern. However, regardless of the physical mounting or positioning of the elements of the array, they are nonetheless preferably electrically connected as a direct access matrix.

It will be understood that a direct access matrix is a matrix connection in which any individual antenna transducer in the matrix may be directly connected to circuitry outside of the matrix by appropriately selecting one terminal from the first terminal strip 14 and a second terminal from the second terminal strip 16. For example, the antenna transducer 18 may be selected by connecting the outside circuitry to terminals 20 and 22.

A switching means is connected to the terminal strips 14 and 16 for sequentially connecting each of the antenna transducers to a signal processing means. This switching means includes a first plurality of gates indicated generally as 24 and a second plurality of gates indicated generally as 26. Each of the gates 26, such as the gate 30, is connected between one of the terminals of the terminal strip 16, such as terminal 22, and a common bus line 32. The gates 26 are of course switches which, when switched on, connect their associated terminal, such as terminal 22, to the bus line 32. In that manner signals are gated between the terminal strip 16 and the bus line 32.

Similarly, each of the gates 24, such as gate 34, is connected between a terminal of terminal strip 14, such as terminal 20, and another common bus 36. The gates 24 operate with the similar purpose of gating signals between their associated terminal of the terminal strip 14 and the common bus 36. Thus, for example, with the gates 30 and 34 switched on, the antenna transducer 18 is connected to the bus lines 32 and 36.

Each of the gates 24 and 26 includes a control input which operates to control the switching of its associated gate. For example, the gate 30 has control input 40 while the gate 34 has the control input 42.

The control inputs for all the gates 26 are connected to a shift register means 44 which, as will be seen, operates to shift an input pulse along its output terminals from output terminal 46 to output terminal 48. The preferred shift register is a line, as indicated, although other devices which transfer a pulse serially along a series of outputs can equivalently be used. For example, a chain of discrete flip-flops could be used with suitable clock connections.

The shift register means 44 also has an input 50 which is connected to receive pulses generated at a clock pulse generator 52. The input a single pulse at the input 50 in turn sequentially opens the gates 26.

In a similar manner, the gates 24 are connected to another delay line shift register 60 having an input 63 also connected to receive pulses generated by the clock pulse generator 52. The delay line shift register 60 similarly sequentially opens the gates 24. The delay line shift registers 44 and 60 are driven by delay line drivers 62 and 64 respectively.

Frequency dividers 66 and 68 are interposed between the clock pulse generator 52 and the delay line drivers 62 and 64. In the preferred embodiment, the divider 68 divides by 100 while the divider 66 divides by 1,000. Consequently, ten pulses are delivered to the delay line shift register 44 in the same time interval that one pulse is delivered to the delay line shift register 60. Each of these delay line shift registers are designed with circuit element values so that the period of its input pulses is equal to the time required for an input pulse to cycle through the delay line shift register. This results in the connection in sequence of each of the antenna transducers to the bus lines 32 and 36.

In the preferred embodiment of the invention a transmitter and a receiver may be connected respectively to terminals 70 and 72 of an alternate transmit/receive switch 74. Thus, the signal processing means comprises a transmitter and a receiver. The alternate transmit/receive switch 74 simply alternately connects the bus lines 32 and 36 to the transmit terminal 70 and to the receive terminal 72. It does so at a rate governed by the input pulse rate at its control input 78. Preferably, another frequency divider 80 is interposed between the clock pulse generator 52 and the control input 78 of the transmit/receive switch 74 so that the switch 74 will receive ten pulses in the time interval that the delay line shift register 44 receives one pulse. Alternatively the divider 80 could be a divide by 50 divider which would provide two pulses at the control input 78 of the transmit/receive switch for each pulse delivered to the delay line shift register 44. If the switch were a simple triggered flip-flop, this, in effect, would connect each antenna transducer of the matrix one time to the transmitter at terminal 70 and one time to the receiver at terminal 72 for each connection of a single antenna transducer to the bus lines 32 and 36.

However the preferred divider 80 divides by 10 and the preferred transmit/receive switch 74 includes a monostable multivibrator or one shot. A pulse at the control input 78 actuates the one shot which switches the transmit/receive switch 74 to a transmit state. After a selected time interval, preferably one half the period of the pulses at the control input 78, the one shot returns to its stable state and thereby switches the transmit/receive switch 74 to a receive state. In this manner each antenna transducer is connected first to transmit and then to receive.

However, the time interval between input pulses at the input 78 could be apportioned in any desirable manner. Alternatively one antenna could be connected solely for transmitting while another subsequently connected one would be connected for reception.

In the preferred embodiment illustrated in the FIGURE, the clock pulse generator 52 is connected directly to the transmitter terminal 70 of the transmit/receive switch 74. The clock pulse generator 52 thus effectively operates as a transmitter with each of the antenna transducers of the matrix energized in sequence by the pulses from the clock pulse generator 52.

In examining the operation of the preferred embodiment of the invention illustrated in the drawing, it may be assumed that the clock pulse generator 52 generates triggering pulses having a period as illustrated on the drawing of 0.0036 microseconds. Consequently, pulses applied to the input 63 of the delay line shift register 60 after the operation of the divider 66 will have a period of 3.6 microseconds. Similarly, the clock pulses after being divided by the divider 68 will provide pulses having a period of 0.36 microseconds for application to the input 50 to the delay line shift register 44. Pulses divided by the divider 80 and applied to the control input 78 of the transmit receive switch 74 will have a period of 0.036 microseconds.

The preferred delay line 60 has inductor and capacitor values illustrated in the drawing which results in the input pulse moving along the delay line 60 at a rate of 0.36 microseconds per output terminal. Similarly, the delay line shift register 44 is designated with the element values illustrated so that an input pulse is transferred along the delay line 44 at a rate of 0.036 microseconds per output terminal. Consequently, the first input pulse arriving at the input 50 of the delay line shift register 44 opens the first gate 82. Simultaneously the first input pulse at the input 63 of the delay line shift register 60 opens the gate 84. After the elapse of 0.036 microseconds the gate 86 is opened and all other gates are closed and the gate 84 remains open. Consequently, connection is switched from connection to antenna transducer 12 to antenna transducer 88. After each subsequent 0.036 microsecond interval, the next transducers in turn are connected to the bus line 32.

After the elapse of 0.36 microseconds, a second pulse occurs at the input 50 of the delay line shift register 44 which recycles the delay line shift register 44. At this same instant of time, gate 34 is switched on so that for the next interval of 0.36 microseconds each of the antenna transducers along the line 90 are in turn sequentially connected to the bus lines 32 and 36.

After an elapse of a total of 3.6 microseconds each of the gates 24 will have been connected for a time interval of 0.36 microseconds to a line of antenna transducers. During each of those 0.36 microsecond intervals each of the gates 26 will sequentially be connected to a different one of the transducers along the particular line. In this manner all of the transducers are in turn sequentially connected to the bus lines 32 and 36.

The period for the pulses at the control input terminal 78 of the transmit/receive switch 74 is 0.036 microseconds. Consequently during the 0.036 microseconds that each antenna transducer is connected to the bus lines 32 and 36, the alternate transmit/receive switch 74 will alternately connect these bus lines 32 and 36 to the transmitter at terminal 70 for half the connection time to the receiver at terminal 72 for the other half of the connection time.

Therefore, each antenna transducer is connected in sequence to the bus lines 32 and 36. In the preferred embodiment, each is connected for a time interval of 0.036 microseconds. During this time each receives five energizing pulses from the pulse generator 52 which cause the radiation of radiant energy and then it is connected in a receive state to absorb and detect any reflection from these five energizations.

Alternatively of course fewer than five energizing pulses could be coupled to each antenna transducer and a longer time interval allowed for reception of any reflections.

It is to be understood that while the detailed drawing and specific examples given describe preferred embodiments of the invention, they are for the purposes of illustration only that the apparatus of the invention is not limited to the precise details and conditions disclosed and that various changes may be made therein without departing from the spirit of the invention whcih is defined by the following claims.

What is claimed is:

1. A radiant energy apparatus for connection to a signal processing means comprising:
   a. a physically spaced array of antennae interconnected as a direct access matrix; and
   b. a switching means for sequentially connecting each of said antennae to said signal processing means.

2. An apparatus according to claim 1 wherein a clock pulse means is connected to said switching means for generating a series of control pulses for control of said switching means.

3. An apparatus according to claim 2 wherein said signal processing means comprises a transmitter and a receiver and wherein said switching means includes means for alternatively connecting each of said antennae to said transmitter and to said receiver.

4. An apparatus according to claim 2 wherein said antennae are electromagnetic transducers electrically interconnected as a two dimensional matrix having two series of connecting terminals.

5. An apparatus according to claim 4 wherein said switching means comprises (a) a plurality of gate means each gate means having a control input and including a gate means for gating signals between each of said terminals and said signal processing means and (b) a pair of pulse shift register means each having an input connected to receive pulses from said clock pulse means and a plurality of outputs connected to the control inputs of the gate means connected to a different one of said series of said connecting terminals for sequentially opening said gates.

6. An apparatus according to claim 5 wherein pulse divider means is interposed between said clock pulse means and said shift register means for applying one pulse to one of said shift register means and in the same time interval applying a number of pulses to the other shift register means equal to the number of said connecting terminals associated therewith.

7. An apparatus according to claim 6 wherein said signal processing means comprises a transmitter and a receiver and wherein said switching means includes means for alternatively connecting said antennae to said transmitter and to said receiver.

8. An apparatus according to claim 7 wherein a further pulse divider means is interposed between said clock pulse means and said alternatively switching means and wherein said pulse divider means are selectively designed for sequentially connecting each of said transducers to said alternatively connecting switch means which operates at a rate at least twice the rate that said transducer means are sequentially switched.

9. An apparatus according to claim 8 wherein each of said shift register means comprises a delay line.

10. An apparatus according to claim 8 wherein said array comprises a plurality of inductors.

11. An apparatus according to claim 7 wherein said clock pulse means is connected operate as said transmitter, having said control pulses at times applied to said inductors for generating electromagnetic radiation.

12. An apparatus according to claim 11 wherein said alternatively switching means switches at a rate one tenth of the clock pulse rate; wherein one of said shift register means is pulsed at a rate 1/100 the clock pulse rate; and the other shift register means is pulsed at a rate 1/1000 the clock pulse rate.

* * * * *